(12) United States Patent
Lin et al.

(10) Patent No.: US 12,211,198 B2
(45) Date of Patent: Jan. 28, 2025

(54) METHOD FOR DETECTING DEFECTS IN DIVIDED AND FURTHER DIVIDED IMAGES BASED ON TRAINED MODELS, ELECTRONIC DEVICE, AND STORAGE MEDIUM

(71) Applicant: HON HAI PRECISION INDUSTRY CO., LTD., New Taipei (TW)

(72) Inventors: Tzu-Chen Lin, New Taipei (TW); Chin-Pin Kuo, New Taipei (TW); Tung-Tso Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 367 days.

(21) Appl. No.: 17/573,838

(22) Filed: Jan. 12, 2022

(65) Prior Publication Data
US 2022/0222800 A1    Jul. 14, 2022

(30) Foreign Application Priority Data
Jan. 12, 2021  (CN) .......................... 202110037823.1

(51) Int. Cl.
*G06T 7/00* (2017.01)
*G06N 3/08* (2023.01)

(52) U.S. Cl.
CPC ............... *G06T 7/001* (2013.01); *G06N 3/08* (2013.01); *G06T 2207/20021* (2013.01); *G06T 2207/20081* (2013.01); *G06T 2207/20084* (2013.01)

(58) Field of Classification Search
CPC .......... G06T 7/001; G06T 2207/20021; G06T 2207/20081; G06T 2207/20084; G06T 2207/20076; G06T 7/0008; G06T 7/0002; G06T 7/136; G06T 2207/10004; G06N 3/08; G06N 3/045; G06N 3/04; G06F 18/214
See application file for complete search history.

(56) References Cited

U.S. PATENT DOCUMENTS

2020/0357106 A1* 11/2020 Lin ...................... G06V 10/764
2021/0019890 A1*  1/2021 Chen ........................ G06T 7/11

* cited by examiner

*Primary Examiner* — Hwa Andrew Lee
(74) *Attorney, Agent, or Firm* — ScienBiziP, P.C.

(57) ABSTRACT

A method for detecting image abnormities, applied in an electronic device, and stored in a storage medium are provided, obtains images for analysis. The images are divided into a plurality of first divided images and a plurality of second divided images by reference to image size. A first abnormity score is obtained by inputting the image into a first pre-trained abnormity detection model. A plurality of second abnormity scores are obtained by inputting the first divided images into a second pre-trained abnormity detection model. A plurality of third abnormity scores are obtained by inputting the second divided images into a third pre-trained abnormity detection model. An abnormal type of the image is determined according to a preset abnormity database in response to an abnormity detected in the image, the method improves accuracy of defect detection.

17 Claims, 2 Drawing Sheets

METHOD FOR DETECTING DEFECTS IN DIVIDED AND FURTHER DIVIDED IMAGES BASED ON TRAINED MODELS, ELECTRONIC DEVICE, AND STORAGE MEDIUM

FIELD

The present application relates to a technical field of imaging, and more particularly to a method for detecting defects, an electronic device, and a storage medium.

BACKGROUND

Generally, a product may have one or more defects which maybe too small to be detected, and a reason or type of defect cannot be determined.

Therefore, it is important to improve the accuracy of image analysis.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
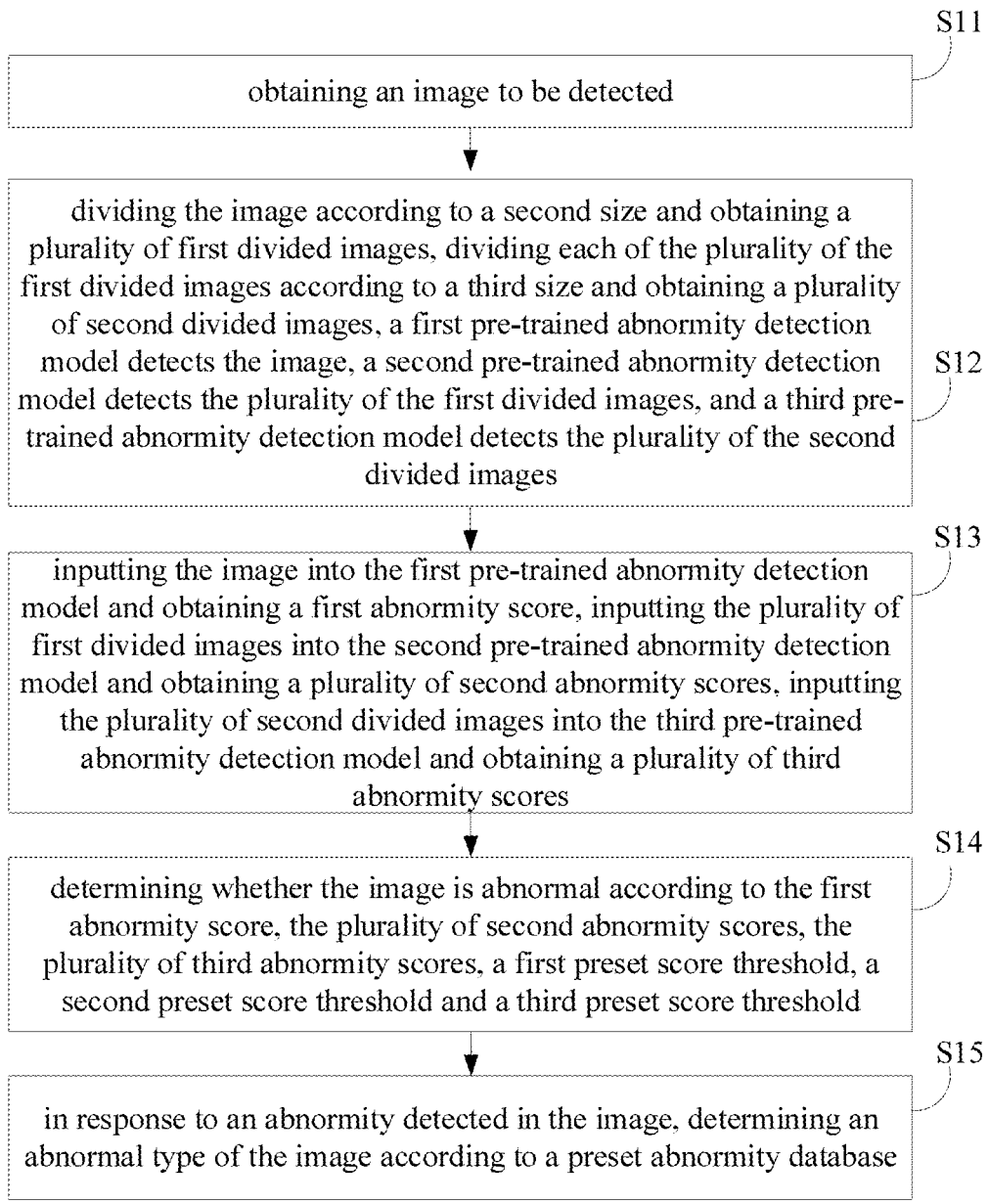
FIG. 1 is a flowchart diagram of a method for detecting image abnormities in an embodiment of the present application.

FIG. 1 is a flowchart diagram of a method for detecting image abnormities in an embodiment of the present application.

In one embodiment, the method for detecting defects in a product by reference to images thereof (hereinafter referred to as "abnormities") may be applied to one or more electronic devices 3. The electronic device 3 includes hardware such as, but is not limited to, a microprocessor and an Application Specific Integrated Circuit (ASIC), a Field-Programmable Gate Array (FPGA), a Digital Signal Processor (DSP), embedded devices, for example.

The electronic device 3 may be any electronic product that can interact with a user, such as a personal computer, a tablet computer, a smart phone, a personal digital assistant (Personal Digital Assistant, PDA), a game console, an interactive network television (Internet Protocol Television, IPTV), or smart wearable device, for example.

The electronic device 3 may also include a network device and/or a user device. The network device includes, but is not limited to, a single network server, a server group including multiple network servers, or a cloud including a large quantity of hosts or network servers based on a cloud computing technology.

A network can include, but is not limited to, the Internet, a wide area network, a metropolitan area network, a local area network, and a virtual private network (VPN), for example.

In block S11, the electronic device 3 obtains an image to be detected.

In one embodiment, the image may be an image of any surface of an object (e.g., a physical product, such as a mobile phone, a computer, etc.) with a preset size.

In one embodiment, the electronic device 3 trains a neural network using a preset image training set. The preset image training set can be an image database with annotation messages.

Specifically, a first preset image training set, a second preset image training set, and a third preset image training set are obtained. A first pre-trained abnormity detection model is obtained by training the neural network using the first preset image training set. A second pre-trained abnormity detection model is obtained by training the neural network using the second preset image training set. A third pre-trained abnormity detection model is obtained by training the neural network using the third preset image training set.

The images of the first preset image training set correspond to a first size (for example, 256×256), the images of the second preset image training set correspond to a second size (for example, 128×128), and the images of the third preset image training set correspond to a third size (for example, 64×64). The first preset image training set, the second preset image training set, and the third preset image training set may be obtained from an image library (e.g., a database, a server, or any storage device) which stores images having different sizes. Images having different sizes are detected using different abnormity detection models.

In one embodiment, the electronic device 3 obtains preset images of products without defects ("preset image set without abnormity"), the preset image set without abnormity includes a first size image set, a second size image set, and a third size image set. The electronic device 3 inputs the first size image set into the first pre-trained abnormity detection model, and obtains a plurality of scores corresponding to the first size image set. A plurality of scores corresponding to the second size image set are obtained by inputting the second size image set into the second pre-trained abnormity detection model. A plurality of scores corresponding to the third size image set are obtained by inputting the third size image set into the third pre-trained abnormity detection model. A first preset score threshold is determined according to the plurality of scores corresponding to the first size image set. A second preset score threshold is determined according to the plurality of scores corresponding to the second size image set. A third preset score threshold is determined according to the plurality of scores corresponding to the third size image set.

The plurality of scores corresponding to the first size image set are obtained by inputting the first size image set into the first pre-trained abnormity detection model, and the plurality of scores corresponding to the first size image set indicate a scoring range that the first pre-trained abnormity detection model determines that an image of the first size image set is a normal image for such scoring range. The first preset score threshold is determined according to the plurality of scores corresponding to the first size image set. The plurality of scores corresponding to the second size image set are obtained by inputting the second size image set into the second pre-trained abnormity detection model, and the plurality of scores corresponding to the second size image set indicate a scoring range that the second pre-trained abnormity detection model determines that the image of the second size image set is a normal image within such scoring range. The second preset score threshold is determined according to the plurality of scores corresponding to the second size image set. The plurality of scores corresponding to the third size image set are obtained by inputting the third size image set into the third pre-trained abnormity detection model, and the plurality of scores corresponding to the third size image set indicate such scoring range that the third pre-trained abnormity detection model determines that the image of the third size image set is a normal image within such scoring range. The third preset score threshold is determined according to the plurality of scores corresponding to the third size image set.

Specifically, a first average value and a first standard deviation of the plurality of scores corresponding to the first size image set are determined. A second average value and a second standard deviation of the plurality of scores corresponding to the second size image set are determined. A third average value and a third standard deviation of the plurality of scores corresponding to the third size image set are determined. The electronic device 3 determines that the first preset score threshold is a sum of the first average value and the first standard deviation, determines that the second preset score threshold is a sum of the second average value and the second standard deviation, and determines that the third preset score threshold is a sum of the third average value and the third standard deviation.

The first average value and the first standard deviation of the plurality of scores corresponding to the first size image set are determined. The sum of the first average value and the first standard deviation represents an upper limit of the score of the normal image in the first size image set in most of first detection models. That is, when a score is greater than the sum of the first average value and the first standard deviation, this indicates that the score has a high probability. Therefore, it can be determined that the first preset score threshold is the sum of the first average value and the first standard deviation. In the same way, the second preset score threshold is determined to be the second average value and the second standard deviation, and the third preset score threshold is determined to be the third average value and the third standard deviation.

In block S12, the electronic device 3 divides the image into a plurality of first divided images and a plurality of second divided images.

In one embodiment, the image corresponds to different images from the plurality of first divided images and the plurality of second divided images. For example, a size of the image is 258×258, and after a first division, four first divided images with a size of 128×128 are obtained. After a second division, sixteen second divided images with a size of 64×64 are obtained.

In block S13, the electronic device 3 inputs the image into a first pre-trained abnormity detection model and obtains a first abnormity score, inputs the plurality of first divided images into a second pre-trained abnormity detection model and obtains a plurality of second abnormity scores, and inputs the plurality of second divided images into a third pre-trained abnormity detection model and obtains a plurality of third abnormity scores.

In one embodiment, an image corresponds to an abnormity score.

In block S14, the electronic device 3 determines whether the image is abnormal according to the first abnormity score, the plurality of second abnormity scores, the plurality of third abnormity scores, a first preset score threshold, a second preset score threshold, and a third preset score threshold.

In one embodiment, in response that the first abnormity score is less than or equal to the first preset score threshold, the electronic device 3 determines whether there is a second abnormity score greater than the second preset score threshold among the plurality of second abnormity scores. In response that no second abnormality score is greater than the second preset score threshold among the plurality of second abnormity scores, the electronic device 3 determines whether there is a third abnormity score that is greater than the third preset score threshold among the plurality of third abnormity scores. In response that no third abnormality score is greater than the third preset score threshold among the plurality of third abnormity scores, the electronic device 3 determines that the image does not have any abnormity.

In one embodiment, in response that the first abnormity score is greater than the first preset score threshold, the electronic device 3 determines that the image has at least one abnormity.

In one embodiment, in response that the first abnormity score is less than or equal to the first preset score threshold, and there is a second abnormity score greater than the second preset score threshold among the plurality of second abnormity scores, the electronic device 3 determines that the image has at least one abnormity.

In one embodiment, in response that no second abnormality score is greater than the second preset score threshold among the plurality of second abnormity scores, and there is a third abnormality score that is greater than the third preset score threshold among the plurality of third abnormity scores, the electronic device 3 determines that the image has at least one abnormity.

In block S15, in response to an abnormity detected in the image, the electronic device 3 determines an abnormal type of the image according to a preset abnormity database.

In one embodiment, a plurality of similarities between the image and each abnormal image in the preset abnormity database are determined. A target image from the preset abnormity database is determined according to the plurality of similarities, the target image having the greatest similarity with the image. An abnormal type corresponding to the target image is determined to be the abnormal type of the image.

The plurality of similarities can be determined by calculating a difference between a mean-square error (MSE) of the image and a mean square error of each abnormal image in the preset abnormity database. When the difference is smaller, the similarity is higher. When the difference is greater, the similarity is lower.

In the above embodiments, the image can be divided, and the plurality of first divided images and the plurality of second divided images are obtained. The image, the plurality of first divided images, and the plurality of second divided images are detected. By detecting image abnormities from a plurality of dimensions, a recognition rate of small defects can be improved, and finally the abnormal type according to the preset abnormity database can be determined, thereby improving an accuracy of abnormity detection.

Figure 2:
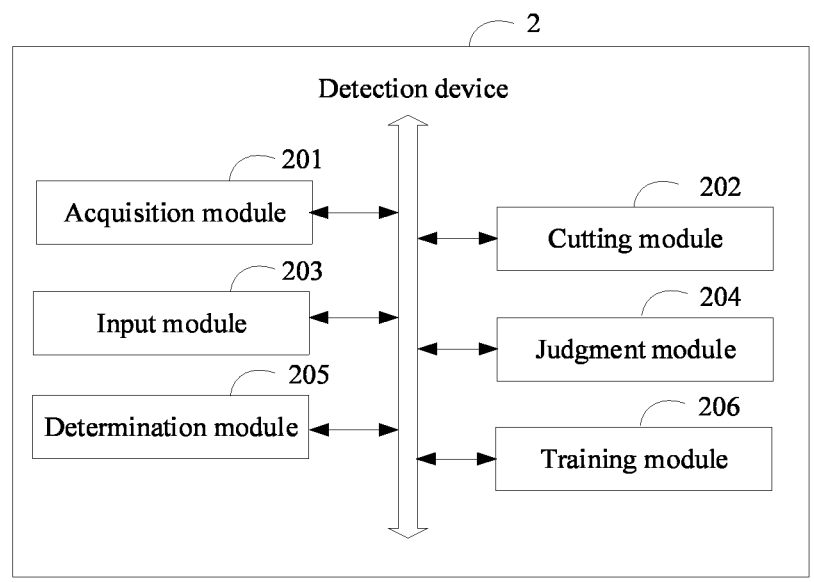
FIG. 2 is a structural diagram of a detection device in an embodiment of the present application.

FIG. 2 is a structural diagram of a detection device in an embodiment of the present application.

As shown in FIG. 2, a detection device 2 includes an acquisition module 201, a cutting module 202, an input module 203, a judgment module 204, a determination module 205, and a training module 206. The modules in the present application refer to one of a stored series of computer-readable instruction segments that can be executed by at least one processor and that are capable of performing preset functions. In some embodiments, the functions of each module will be described.

The acquisition module 201 obtains an image to be detected.

In one embodiment, the image may be an image of any surface of an object (e.g., a physical product, such as a mobile phone, a computer, etc.) with a preset size.

In one embodiment, the training module 206 trains a neural network using a preset image training set. The preset image training set can be an image database with annotation messages.

Specifically, a first preset image training set, a second preset image training set, and a third preset image training set are obtained. A first pre-trained abnormity detection model is obtained by training the neural network using the first preset image training set. A second pre-trained abnormity detection model is obtained by training the neural network using the second preset image training set. A third pre-trained abnormity detection model is obtained by training the neural network using the third preset image training set.

The images of the first preset image training set correspond to a first size (for example, 256×256), the images of the second preset image training set correspond to a second size (for example, 128×128), and the images of the third preset image training set correspond to a third size (for example, 64×64). The first preset image training set, the second preset image training set, and the third preset image training set may be obtained from an image library (e.g., a database, a server, or any storage device) which stores images having different sizes. Images having different sizes are detected using different abnormity detection models.

In one embodiment, the acquisition module 201 obtains preset images set of products without defects ("preset image set without abnormity"), the preset image set without abnormity includes a first size image set, a second size image set, and a third size image set. The input module 203 inputs the first size image set into the first pre-trained abnormity detection model, and obtains a plurality of scores corresponding to the first size image set. A plurality of scores corresponding to the second size image set are obtained by inputting the second size image set into the second pre-trained abnormity detection model. A plurality of scores corresponding to the third size image set are obtained by inputting the third size image set into the third pre-trained abnormity detection model. A first preset score threshold is determined according to the plurality of scores corresponding to the first size image set. A second preset score threshold is determined according to the plurality of scores corresponding to the second size image set. A third preset score threshold is determined according to the plurality of scores corresponding to the third size image set.

The plurality of scores corresponding to the first size image set are obtained by inputting the first size image set into the first pre-trained abnormity detection model, and the plurality of scores corresponding to the first size image set indicate a scoring range that the first pre-trained abnormity detection model determines that an image of the first size image set is a normal image for such scoring range. The first preset score threshold is determined according to the plurality of scores corresponding to the first size image set. The plurality of scores corresponding to the second size image set are obtained by inputting the second size image set into the second pre-trained abnormity detection model, and the plurality of scores corresponding to the second size image set indicate a scoring range that the second pre-trained abnormity detection model determines that the image of the second size image set is a normal image within such scoring range. The second preset score threshold is determined according to the plurality of scores corresponding to the second size image set. The plurality of scores corresponding to the third size image set are obtained by inputting the third size image set into the third pre-trained abnormity detection model, and the plurality of scores corresponding to the third size image set indicate such scoring range that the third pre-trained abnormity detection model determines that the image of the third size image set is a normal image within such scoring range. The third preset score threshold is determined according to the plurality of scores corresponding to the third size image set.

Specifically, a first average value and a first standard deviation of the plurality of scores corresponding to the first size image set are determined. A second average value and a second standard deviation of the plurality of scores corresponding to the second size image set are determined. A third average value and a third standard deviation of the plurality of scores corresponding to the third size image set are determined. The determination module 205 determines that the first preset score threshold is a sum of the first average value and the first standard deviation, determines that the second preset score threshold is a sum of the second average value and the second standard deviation, and determines that the third preset score threshold is a sum of the third average value and the third standard deviation.

The first average value and the first standard deviation of the plurality of scores corresponding to the first size image set are determined. The sum of the first average value and the first standard deviation represents an upper limit of the score of the normal image in the first size image set in most of first detection models. That is, when a score is greater than the sum of the first average value and the first standard deviation, this indicates that the score has a high probability. Therefore, it can be determined that the first preset score threshold is the sum of the first average value and the first standard deviation. In the same way, the second preset score threshold is determined to be the second average value and the second standard deviation, and the third preset score threshold is determined to be the third average value and the third standard deviation.

The cutting module 202 divides the image into a plurality of first divided images and a plurality of second divided images.

In one embodiment, the image corresponds to different images from the plurality of first divided images and the plurality of second divided images. For example, a size of the image is 258×258, and after a first division, four first divided images with a size of 128×128 are obtained. After a second division, sixteen second divided images with a size of 64×64 are obtained.

The input module 203 inputs the image into a first pre-trained abnormity detection model and obtains a first abnormity score, inputs the plurality of first divided images into a second pre-trained abnormity detection model and obtains a plurality of second abnormity scores, and inputs the plurality of second divided images into a third pretrained abnormity detection model and obtains a plurality of third abnormity scores.

In one embodiment, an image corresponds to an abnormity score.

The judgment module 204 determines whether the image is abnormal according to the first abnormity score, the plurality of second abnormity scores, the plurality of third abnormity scores, a first preset score threshold, a second preset score threshold and a third preset score threshold.

In one embodiment, in response that the first abnormity score is less than or equal to the first preset score threshold, the judgment module 204 determines whether there is a second abnormity score greater than the second preset score threshold among the plurality of second abnormity scores. In response that no second abnormality score is greater than the second preset score threshold among the plurality of second abnormity scores, the judgment module 204 determines whether there is a third abnormity score that is greater than the third preset score threshold among the plurality of third abnormity scores. In response that no third abnormality score is greater than the third preset score threshold among the plurality of third abnormity scores, the judgment module 204 determines that the image does not have any abnormity.

In one embodiment, in response that the first abnormity score is greater than the first preset score threshold, the judgment module 204 determines that the image has at least one abnormity.

In one embodiment, in response that the first abnormity score is less than or equal to the first preset score threshold, and there is a second abnormity score greater than the second preset score threshold among the plurality of second abnormity scores, the judgment module 204 determines that the image has at least one abnormity.

In one embodiment, in response that no second abnormality score is greater than the second preset score threshold among the plurality of second abnormity scores, and there is a third abnormality score that is greater than the third preset score threshold among the plurality of third abnormity scores, the judgment module 204 determines that the image has at least one abnormity.

In response to an abnormity is detected in the image, the determination module 205 determines an abnormal type of the image according to a preset abnormity database.

In one embodiment, a plurality of similarities between the image and each abnormal image in the preset abnormity database are determined. A target image from the preset abnormity database is determined according to the plurality of similarities, the target image having the greatest similarity with the image. An abnormal type corresponding to the target image is determined to be the abnormal type of the image.

The plurality of similarities can be determined by calculating a difference between a mean-square error (MSE) of the image and a mean square error of each abnormal image in the preset abnormity database. When the difference is smaller, the similarity is higher. When the difference is greater, the similarity is lower.

In the above embodiments, the image can be divided, and the plurality of first divided images and the plurality of second divided images are obtained. The image, the plurality of first divided images, and the plurality of second divided images are detected. By detecting image abnormities from a plurality of dimensions, a recognition rate of small defects can be improved, and finally the abnormal type according to the preset abnormity database can be determined, thereby improving an accuracy of abnormity detection.

Figure 3:
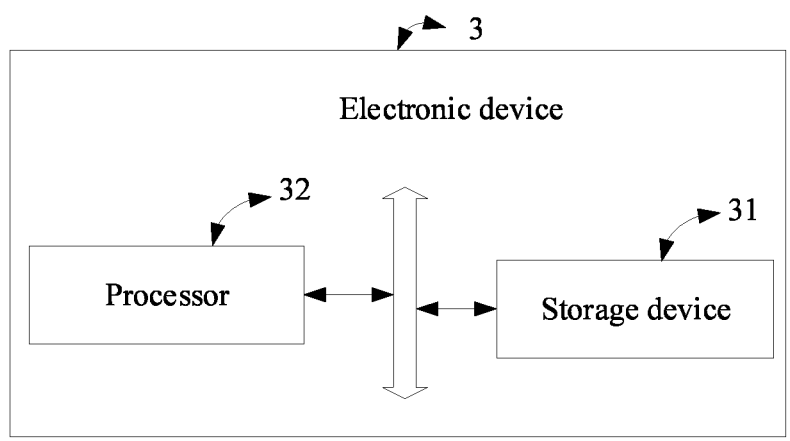
FIG. 3 is a structural diagram of an electronic device for detecting image abnormities in an embodiment of the present application.

FIG. 3 is a structural diagram of an electronic device for detecting image abnormities in an embodiment of the present application. The electronic device 3 may include a storage device 31, at least one processor 32, and computer-readable instructions stored in the storage device 31 and executable by the at least one processor 32, for example, a growth height of a plant determination programs.

Those skilled in the art will understand that FIG. 3 is only an example of the electronic device 3 and does not constitute a limitation on the electronic device 3. Another electronic device 3 may include more or fewer components than shown in the figures or may combine some components or have different components. For example, the electronic device 3 may further include an input/output device, a network access device, a bus, and the like.

The at least one processor 32 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 32 can be a microprocessor or any conventional processor. The processor 32 is a control center of the electronic device 3 and connects various parts of the entire electronic device 3 by using various interfaces and lines.

The processor 32 executes the computer-readable instructions to implement the method for detecting image abnormities in the above embodiments, such as in block S11-S15 shown in FIG. 1. Alternatively, the processor 32 executes the computer-readable instructions to implement the functions of the modules/units in the foregoing device embodiments, such as the modules 201-206 in FIG. 2.

For example, the computer-readable instructions can be divided into one or more modules/units, and the one or more modules/units are stored in the storage device 31 and executed by the at least one processor 32. The one or more modules/units can be a series of computer-readable instruction segments capable of performing specific functions, and the instruction segments are used to describe execution processes of the computer-readable instructions in the electronic device 3. For example, the computer-readable instruction can be divided into the acquisition module 201, the cutting module 202, the input module 203, the judgment module 204, the determination module 205, and the training module 206 as shown in FIG. 2.

The storage device 31 can be configured to store the computer-readable instructions and/or modules/units. The processor 32 may run or execute the computer-readable instructions and/or modules/units stored in the storage device 31 and may call up data stored in the storage device 31 to implement various functions of the electronic device 3. The storage device 31 mainly includes a storage program area and a storage data area. The storage program area may store an operating system, and an application program required for at least one function (such as a sound playback function, an image playback function, for example), for example. The storage data area may store data (such as audio data, phone book data, for example) created during the use of the electronic device 3. In addition, the storage device 31 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 31 may be an external memory and/or an internal memory of the electronic device 3. The storage device 31 may be a memory in a physical form, such as a memory stick, a Trans-flash Card (TF card), for example.

When the modules/units integrated into the electronic device 3 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 1, the storage device 31 in the electronic device 3 stores a plurality of instructions to implement a method for detecting image abnormities, and the processor 32 can execute the multiple instructions to: obtain an image to be detected; divide the image into a plurality of first divided images and a plurality of second divided images; input the image into a first pre-trained abnormity detection model and obtain a first abnormity score, input the plurality of first divided images into a second pre-trained abnormity detection model and obtain a plurality of second abnormity scores, input the plurality of second divided images into a third pre-trained abnormity detection model and obtain a plurality of third abnormity scores; determine whether the image is abnormal according to the first abnormity score, the plurality of second abnormity scores, the plurality of third abnormity scores, a first preset score threshold, a second preset score threshold and a third preset score threshold; and in response to an abnormity detected in the image, determine an abnormal type of the image according to a preset abnormity database.

The computer-readable instructions are executed by the processor 32 to realize the functions of each module/unit in the above-mentioned device embodiments, which will not be repeated here.

In the several embodiments provided in the preset application, the disclosed electronic device and method can be implemented in other ways. For example, the embodiments of the devices described above are merely illustrative. For example, divisions of the modules are based on logical function only, and there can be other manners of division in actual implementation.

In addition, each functional module in each embodiment of the present disclosure can be integrated into one processing module, or can be physically present separately in each unit or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for detecting defects in image, the method comprising:

training a neural network using a preset image training set, comprising: obtaining a first preset image training set, a second preset image training set, and a third preset image training set; training the neural network using the first preset image training set and obtaining a first pre-trained abnormity detection model, training the neural network using the second preset image training set and obtaining a second pre-trained abnormity detection model, training the neural network using the third preset image training set and obtaining a third pre-trained abnormity detection model;

obtaining an image to be detected;

dividing the image according to a second size and obtaining a plurality of first divided images, dividing each of the plurality of the first divided images according to a third size and obtaining a plurality of second divided images, the first pre-trained abnormity detection model detects the image, the second pre-trained abnormity detection model detects the plurality of the first divided images, and the third pre-trained abnormity detection model detects the plurality of the second divided images;

inputting the image into the first pre-trained abnormity detection model and obtaining a first abnormity score, inputting the plurality of first divided images into the second pre-trained abnormity detection model and obtaining a plurality of second abnormity scores, inputting the plurality of second divided images into the third pre-trained abnormity detection model and obtaining a plurality of third abnormity scores;

determining whether the image is abnormal according to the first abnormity score, the plurality of second abnormity scores, the plurality of third abnormity scores, a first preset score threshold, a second preset score threshold and a third preset score threshold; and in response to an abnormity detected in the image, determining an abnormal type of the image according to a preset abnormity database.

2. The method of claim 1, after training the neural network using the preset image training set, and before obtaining the image, further comprising:

obtaining a preset image set without abnormity, wherein the preset image set without abnormity comprises a first size image set, a second size image set and a third size image set;

inputting the first size image set into the first pre-trained abnormity detection model, and obtaining a plurality of scores corresponding to the first size image set;

inputting the second size image set into the second pre-trained abnormity detection model, and obtaining a plurality of scores corresponding to the second size image set;

inputting the third size image set into the third pre-trained abnormity detection model, and obtaining a plurality of scores corresponding to the third size image set; and determining the first preset score threshold according to the plurality of scores corresponding to the first size image set, determining the second preset score threshold according to the plurality of scores corresponding to the second size image set, and determining the third preset score threshold according to the plurality of scores corresponding to the third size image set.

3. The method of claim 2, wherein determining the first preset score threshold according to the plurality of scores corresponding to the first size image set, determining the second preset score threshold according to the plurality of scores corresponding to the second size image set, and determining the third preset score threshold according to the plurality of scores corresponding to the third size image set comprises:

determining a first average value and a first standard deviation of the plurality of scores corresponding to the first size image set;

determining a second average value and a second standard deviation of the plurality of scores corresponding to the second size image set;

determining a third average value and a third standard deviation of the plurality of scores corresponding to the third size image set; and determining that the first preset score threshold is a sum of the first average value and the first standard deviation, determining that the second preset score threshold is a sum of the second average value and the second standard deviation, and determining that the third preset score threshold is a sum of the third average value and the third standard deviation.

4. The method of claim 1, wherein determining the abnormal type of the image according to the preset abnormity database in response that there is an abnormity in the image comprises:

determining a plurality of similarities between the image and each abnormal image in the preset abnormity database;

determining a target image from the preset abnormity database according to the plurality of similarities, wherein the target image has the greatest similarity with the image; and determining an abnormal type corresponding to the target image to be the abnormal type of the image.

5. The method of claim 1, wherein determining whether the image is abnormal according to the first abnormity score, the plurality of second abnormity scores, the plurality of third abnormity scores, a first preset score threshold, a second preset score threshold and a third preset score threshold comprises:

in response that the first abnormity score is less than or equal to the first preset score threshold, determining whether there is a second abnormity score greater than the second preset score threshold among the plurality of second abnormity scores;

in response that no second abnormality score is greater than the second preset score threshold among the plurality of second abnormity scores, determining whether there is a third abnormity score that is greater than the third preset score threshold among the plurality of third abnormity scores; and in response that no third abnormality score is greater than the third preset score threshold among the plurality of third abnormity scores, determining that the image does not have any abnormity.

6. The method of claim 5, further comprising:

in response that the first abnormity score is greater than the first preset score threshold, determining that the image has at least one abnormity; or in response that the first abnormity score is less than or equal to the first preset score threshold, and there is a second abnormity score greater than the second preset score threshold among the plurality of second abnormity scores, determining that the image has at least one abnormity; or in response that no second abnormality score is greater than the second preset score threshold among the plurality of second abnormity scores, and there is a third abnormality score that is greater than the third preset score threshold among the plurality of third abnormity scores, determining that the image has at least one abnormity.

7. An electronic device comprising:

a processor; and a storage device storing a plurality of instructions, which when executed by the processor, cause the processor to:

train a neural network using a preset image training set, comprising: obtain a first preset image training set, a second preset image training set, and a third preset image training set; train the neural network using the first preset image training set and obtain a first pre-trained abnormity detection model, train the neural network using the second preset image training set and obtain a second pre-trained abnormity detection model, train the neural network using the third preset image training set and obtain a third pre-trained abnormity detection model;

obtain an image to be detected;

divide the image according to a second size and obtain a plurality of first divided images, divide each of the plurality of the first divided images according to a third size and obtain a plurality of second divided images, the first pre-trained abnormity detection model detects the image, the second pre-trained abnormity detection model detects the plurality of the first divided images, and the third pre-trained abnormity detection model detects the plurality of the second divided images;

input the image into the first pre-trained abnormity detection model and obtain a first abnormity score, input the plurality of first divided images into the second pre-trained abnormity detection model and obtain a plurality of second abnormity scores, input the plurality of second divided images into the third pre-trained abnormity detection model and obtain a plurality of third abnormity scores;

determine whether the image is abnormal according to the first abnormity score, the plurality of second abnormity scores, the plurality of third abnormity scores, a first preset score threshold, a second preset score threshold and a third preset score threshold; and in response to an abnormity detected in the image, determine an abnormal type of the image according to a preset abnormity database.

8. The electronic device of claim 7, wherein the processor is further caused to:

obtain a preset image set without abnormity, wherein the preset image set without abnormity comprises a first size image set, a second size image set and a third size image set;

input the first size image set into the first pre-trained abnormity detection model, and obtain a plurality of scores corresponding to the first size image set;

input the second size image set into the second pre-trained abnormity detection model, and obtain a plurality of scores corresponding to the second size image set;

input the third size image set into the third pre-trained abnormity detection model, and obtain a plurality of scores corresponding to the third size image set; and determine the first preset score threshold according to the plurality of scores corresponding to the first size image set, determine the second preset score threshold according to the plurality of scores corresponding to the second size image set, and determine the third preset score threshold according to the plurality of scores corresponding to the third size image set.

9. The electronic device of claim 8, wherein the processor is further caused to:

determine a first average value and a first standard deviation of the plurality of scores corresponding to the first size image set;

determine a second average value and a second standard deviation of the plurality of scores corresponding to the second size image set;

determine a third average value and a third standard deviation of the plurality of scores corresponding to the third size image set; and determine that the first preset score threshold is a sum of the first average value and the first standard deviation, determine that the second preset score threshold is a sum of the second average value and the second standard deviation, and determine that the third preset score threshold is a sum of the third average value and the third standard deviation.

10. The electronic device of claim 7, wherein the processor is further caused to:

determine a plurality of similarities between the image and each abnormal image in the preset abnormity database;

determine a target image from the preset abnormity database according to the plurality of similarities, wherein the target image has the greatest similarity with the image; and determine an abnormal type corresponding to the target image to be the abnormal type of the image.

11. The electronic device of claim 7, wherein the processor is further caused to:

in response that the first abnormity score is less than or equal to the first preset score threshold, determine whether there is a second abnormity score greater than the second preset score threshold among the plurality of second abnormity scores;

in response that no second abnormality score is greater than the second preset score threshold among the plurality of second abnormity scores, determine whether there is a third abnormity score that is greater than the third preset score threshold among the plurality of third abnormity scores; and in response that no third abnormality score is greater than the third preset score threshold among the plurality of third abnormity scores, determine that the image does not have any abnormity.

12. The electronic device of claim 11, wherein the processor is further caused to:

in response that the first abnormity score is greater than the first preset score threshold, determine that the image has at least one abnormity; or in response that the first abnormity score is less than or equal to the first preset score threshold, and there is a second abnormity score greater than the second preset score threshold among the plurality of second abnormity scores, determine that the image has at least one abnormity; or in response that no second abnormality score is greater than the second preset score threshold among the plurality of second abnormity scores, and there is a third abnormality score that is greater than the third preset score threshold among the plurality of third abnormity scores, determine that the image has at least one abnormity.

13. A non-transitory storage medium having stored thereon at least one computer-readable instructions that, when executed by a processor of an electronic device, causes the processor to perform a method for detecting defects in image, the method comprising:

training a neural network using a preset image training set, comprising: obtaining a first preset image training set, a second preset image training set, and a third preset image training set; training the neural network using the first preset image training set and obtaining the first pre-trained abnormity detection model, training the neural network using the second preset image training set and obtaining the second pre-trained abnormity detection model, training the neural network using the third preset image training set and obtaining the third pre-trained abnormity detection model;

obtaining an image to be detected;

dividing the image according to a second size and obtaining a plurality of first divided images, dividing each of the plurality of the first divided images according to a third size and obtaining a plurality of second divided images, the first pre-trained abnormity detection model detects the image, the second pre-trained abnormity detection model detects the plurality of the first divided images, and the third pre-trained abnormity detection model detects the plurality of the second divided images;

inputting the image into the first pre-trained abnormity detection model and obtaining a first abnormity score, inputting the plurality of first divided images into the second pre-trained abnormity detection model and obtaining a plurality of second abnormity scores, inputting the plurality of second divided images into the third pre-trained abnormity detection model and obtaining a plurality of third abnormity scores;

determining whether the image is abnormal according to the first abnormity score, the plurality of second abnormity scores, the plurality of third abnormity scores, a first preset score threshold, a second preset score threshold and a third preset score threshold; and in response to an abnormity detected in the image, determining an abnormal type of the image according to a preset abnormity database.

14. The non-transitory storage medium of claim 13, after training the neural network using the preset image training set, and before obtaining the image, wherein the method further comprises:
 obtaining a preset image set without abnormity, wherein the preset image set without abnormity comprises a first size image set, a second size image set and a third size image set;
 inputting the first size image set into the first pre-trained abnormity detection model, and obtaining a plurality of scores corresponding to the first size image set;
 inputting the second size image set into the second pre-trained abnormity detection model, and obtaining a plurality of scores corresponding to the second size image set;
 inputting the third size image set into the third pre-trained abnormity detection model, and obtaining a plurality of scores corresponding to the third size image set; and
 determining the first preset score threshold according to the plurality of scores corresponding to the first size image set, determining the second preset score threshold according to the plurality of scores corresponding to the second size image set, and determining the third preset score threshold according to the plurality of scores corresponding to the third size image set.

15. The non-transitory storage medium of claim 14, wherein determining the first preset score threshold according to the plurality of scores corresponding to the first size image set, determining the second preset score threshold according to the plurality of scores corresponding to the second size image set, and determining the third preset score threshold according to the plurality of scores corresponding to the third size image set comprises:
 determining a first average value and a first standard deviation of the plurality of scores corresponding to the first size image set;
 determining a second average value and a second standard deviation of the plurality of scores corresponding to the second size image set;
 determining a third average value and a third standard deviation of the plurality of scores corresponding to the third size image set; and
 determining that the first preset score threshold is a sum of the first average value and the first standard deviation, determining that the second preset score threshold is a sum of the second average value and the second standard deviation, and determining that the third preset score threshold is a sum of the third average value and the third standard deviation.

16. The non-transitory storage medium of claim 13, wherein determining the abnormal type of the image according to the preset abnormity database in response that there is an abnormity in the image comprises:
 determining a plurality of similarities between the image and each abnormal image in the preset abnormity database;
 determining a target image from the preset abnormity database according to the plurality of similarities, wherein the target image has the greatest similarity with the image; and
 determining an abnormal type corresponding to the target image to be the abnormal type of the image.

17. The non-transitory storage medium of claim 13, wherein determining whether the image is abnormal according to the first abnormity score, the plurality of second abnormity scores, the plurality of third abnormity scores, a first preset score threshold, a second preset score threshold and a third preset score threshold comprises:
 in response that the first abnormity score is less than or equal to the first preset score threshold, determining whether there is a second abnormity score greater than the second preset score threshold among the plurality of second abnormity scores;
 in response that no second abnormality score is greater than the second preset score threshold among the plurality of second abnormity scores, determining whether there is a third abnormity score that is greater than the third preset score threshold among the plurality of third abnormity scores; and
 in response that no third abnormality score is greater than the third preset score threshold among the plurality of third abnormity scores, determining that the image does not have any abnormity.

\* \* \* \* \*